United States Patent
Batten et al.

(10) Patent No.: US 6,614,563 B1
(45) Date of Patent: Sep. 2, 2003

(54) FLAT PANEL ILLUMINATOR ACTIVE TRANSPARENCY ADAPTER

(75) Inventors: Patrick A Batten, Ft Collins, CO (US); Michael L Christensen, Windsor, CO (US); John G Thelen, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/281,600

(22) Filed: Mar. 30, 1999

(51) Int. Cl.[7] .................................................. H04N 1/04
(52) U.S. Cl. ........................ 358/487; 358/475; 358/497
(58) Field of Search ................................. 358/487, 475, 358/474, 506, 497, 494, 509; 250/234, 227.11; 382/312; 399/211

(56) References Cited

U.S. PATENT DOCUMENTS

| | | | | |
|---|---|---|---|---|
| 5,038,227 A | * | 8/1991 | Koshiyouji et al. ......... | 358/471 |
| 5,781,311 A | * | 7/1998 | Inoue et al. ................. | 358/475 |
| 5,986,774 A | * | 11/1999 | Han ........................... | 358/487 |
| 6,185,011 B1 | * | 2/2001 | William ...................... | 358/474 |
| 6,316,766 B1 | * | 11/2001 | Han ........................... | 250/234 |

* cited by examiner

Primary Examiner—Cheukfan Lee

(57) ABSTRACT

A transparency adaptor is described that includes a flat panel illuminator within the scanner lid of the scanner. The flat panel illuminator provides backlighting for scanning transparencies, such that light passes through the transparency only once and into the scanner optics within the scanner base. When the flat panel illuminator is lit during a scanning process, the light source within the scanner is not lit. In a second embodiment, the flat panel illuminator is removeably attached to the scanner lid. Another alternative is for the flat panel illuminator adapter to be a separate from the scanner, such that it is placed over a transparent document when needed, either plugging into the scanner or a separate power source during the scanning process.

17 Claims, 3 Drawing Sheets

FLAT PANEL ILLUMINATOR ACTIVE TRANSPARENCY ADAPTER

FIELD OF THE INVENTION

The present invention relates generally to the field of scanners and other devices used for transforming an optical image of a document into an electronic signal and more particularly to a flat panel illuminator active transparency adapter for a scanner.

BACKGROUND OF THE INVENTION

Electronic document scanners, copiers, and facsimile machines transform an optical image of a document, photograph or transparency into an electronic signal suitable for storing, displaying, printing, processing by a computer or electronic transmission. A document scanner may be a separate device or a document scanner may be a part of a copier, part of a facsimile machine or part of a multipurpose device. For opaque documents, reflective scanners typically have a controlled light source which is reflected off of the surface of a document, through an optics system, and onto an array of photosensitive devices. The photosensitive devices convert received light intensity into an electronic signal. Transparency scanners pass light through a transparent image, for example a photographic positive slide, through an optics system, and then onto an array of photosensitive devices.

A transparent image may be scanned in a reflective scanner by placing a white surface behind the transparency. In such an arrangement, light passes through the transparency to the white background, reflects off the white background and passes through the transparency a second time before impinging onto the photosensitive devices. Therefore, light is filtered twice by the transparent image. In general, this double filtering creates an unacceptable distortion of gray scale, color, contrast and other image characteristics of interest.

Reflective document scanners may be adapted to scan transparent images by providing a separate light source to back-light the image so that the light passes through the transparency only once. In some systems, separate mirrors, lens and other optics may be required to properly project the image onto the photosensitive devices. Motors may also be required to move the external light source relative to the image. One such method is to use cathode florescent light bulbs in the scanner lid, so that there is back lighting, rather than reflective lighting for scanning transparencies. This method creates a very large scanner lid, since the florescent light bulbs are typically ½ to 1 ½ inches thick. This is also expensive in terms of additional components and requires a complex power supply to ensure that all of the lights are stable and the same brightness throughout the scanning process.

U.S. Pat. No. 5,463,217 (Sobol et al.), which is incorporated herein for all that it teaches and describes, describes a completely passive adapter for scanning transparent images in a reflective scanner without requiring a separate light source for back lighting. A light source in the reflective scanner provides light which passes outside the area of the transparent image. The adapter captures the light which passes outside the area of the transparent image and reflects the light through the transparent image. The reflected light re-enters the scanner along the optical path required by the scanner internal optics. The various embodiments described in Sobol et al. are suitable for a fixed scanner optical path. However, when a new scanner is developed, the angle of the adapted mirrors may need to change to accommodate a different optical path within the new scanner. The adapter of Sobol et al. requires an arrangement of mirrors, metal or a folded metallic coated cardboard adapter to be placed onto the platen glass. The adapter of Sobol et al. comprises at least one additional component to the scanner that may be misplaced or damaged. A similar transparency adapter is disclosed in U.S. Ser. No. 09/127,454 U.S. Pat. No. 6,018,161, entitled Adjustable Adapter for Scanning Transparencies with a Reflective Document Scanner by Patrick Batten et al., filed Jul. 31, 1998, which is also incorporated herein for all that is taught and disclosed. Neither of these methods permits a full size image to be scanned when a transparency is being scanned.

Another method in which reflective scanners have been adapted to scan transparent images by providing a light source and moveable mirrors in the lid of the scanner. U.S. Pat. No. 5,710,425 (McConica et al.), which is incorporated herein for all that it teaches and describes, describes a scanner with a light source and moveable mirrors in the lid of the scanner and two different light paths depending on whether the document to be scanned is opaque or transparent. The first light path would reflect off of an opaque document and the second would pass through a transparent document. The mirrors within the lid reflect light back into the base of the scanner or onto the document being scanned. The device of McConica et al. require many components to be installed within the lid of the scanner and also require two separate sets of optical components to support two different light paths. There are also moving parts within the lid, which may get out of alignment due to opening and closing of the lid as would be required under normal scanner use.

It would be desirable to have a scanner transparency adapter that is integral with the scanner, but does not add significantly to the component count or cost of the scanner, does not add significantly to the manufacturing cost, does not add significantly to the overall height, size or weight of the scanner, does not add moving parts to the lid of the scanner that may get out of alignment due to mechanical jarring accompanied by constant opening and closing of the lid, and does not significantly increase the complexity of the scanner or the power supply of the scanner.

SUMMARY OF THE INVENTION

The above and other aspects of the present invention are accomplished in a scanner that utilizes a flat panel illuminator in the scanner lid in order to provide back lighting when a transparency is being scanned. A scanner according to the present invention will enable the scanner and transparency adapter to be an integral unit that is smaller and less expensive in terms of manufacturing and component costs than the transparency adapters of the prior art. Also, the transparency adapter will have a less complex power supply and will consume less power than the cathode florescent light bulb, backlit transparency adapters of the prior art. The flat panel illuminator of the present invention may also be slid or snapped into the scanner lid so that the end user may simply install the flat panel illuminator into the scanner lid when a transparency is to be scanned. One alternative is to have the scanner base light turned off whenever the flat panel illuminator is lit. Another alternative is for the flat panel illuminator to be unattached and separate from the scanner, such that it can be placed over a transparent document when needed and either plugged into the scanner or a different power source during the scanning process.

BRIEF DESCRIPTION OF THE DRAWINGS

The above and other objects, features and advantages of the present invention will be better understood by reading the following more particular description of the invention, presented in conjunction with the following drawings, wherein.

DETAILED DESCRIPTION OF THE PREFERRED EMBODIMENT

Figure 1:
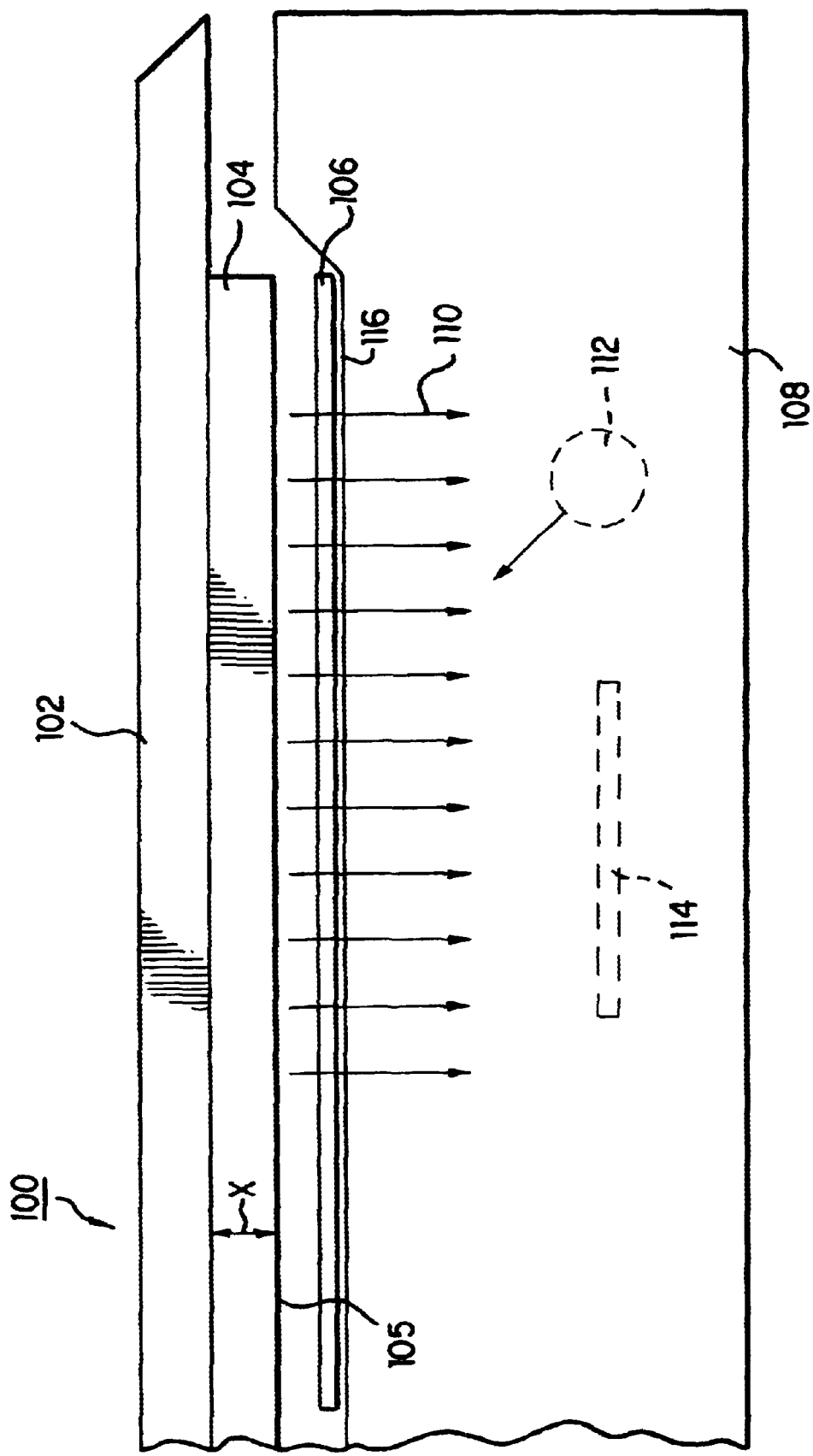
FIG. 1 illustrates a side view of a scanner with a flat panel illuminator adapter in the scanner lid according to a first embodiment of the present invention.

FIG. 1 illustrates a side view of a scanner 100 with a flat panel illuminator 104 in the scanner lid 102 in order to provide back lighting to a transparent document 106, such as an overhead transparency or photographic negative. The flat panel illuminator 104 may be a flat LCD screen illuminator, such as the type used in laptop computers. Typical flat panel screen illuminators 104 generally have a thickness X of approximately 3 mm. A flat panel illuminator 104 is far more stable than florescent cathode light bulbs as far as illumination and power consumption is concerned.

In operation, when a transparency 106 is to be scanned, the user will push a button on the scanner, indicate through a graphical user interface on a host computer controlling the scanner 108, or otherwise indicate to the scanner controller that a transparency 106 is to be scanned. Then during the scanning process, the flat panel illuminator 104 will be lit. The light 110 from the flat panel illuminator 104 will pass through the transparency 106, through a platen 116, through the scanner optics (not shown) and onto a photosensitive transducer 114 within the scanner 108, which transforms the image into an electronic signal representative of the image on the transparency 106. In a preferred embodiment, when the flat panel illuminator 104 is lit and a scan of a transparency 106 is being preformed, the light source 112 within the scanner 108 is not lit. Preferably, surface 105 of flat panel illuminator 104 will be a light diffuser to provide a reflective surface for scanning other types of documents besides transparencies.

Figure 2:
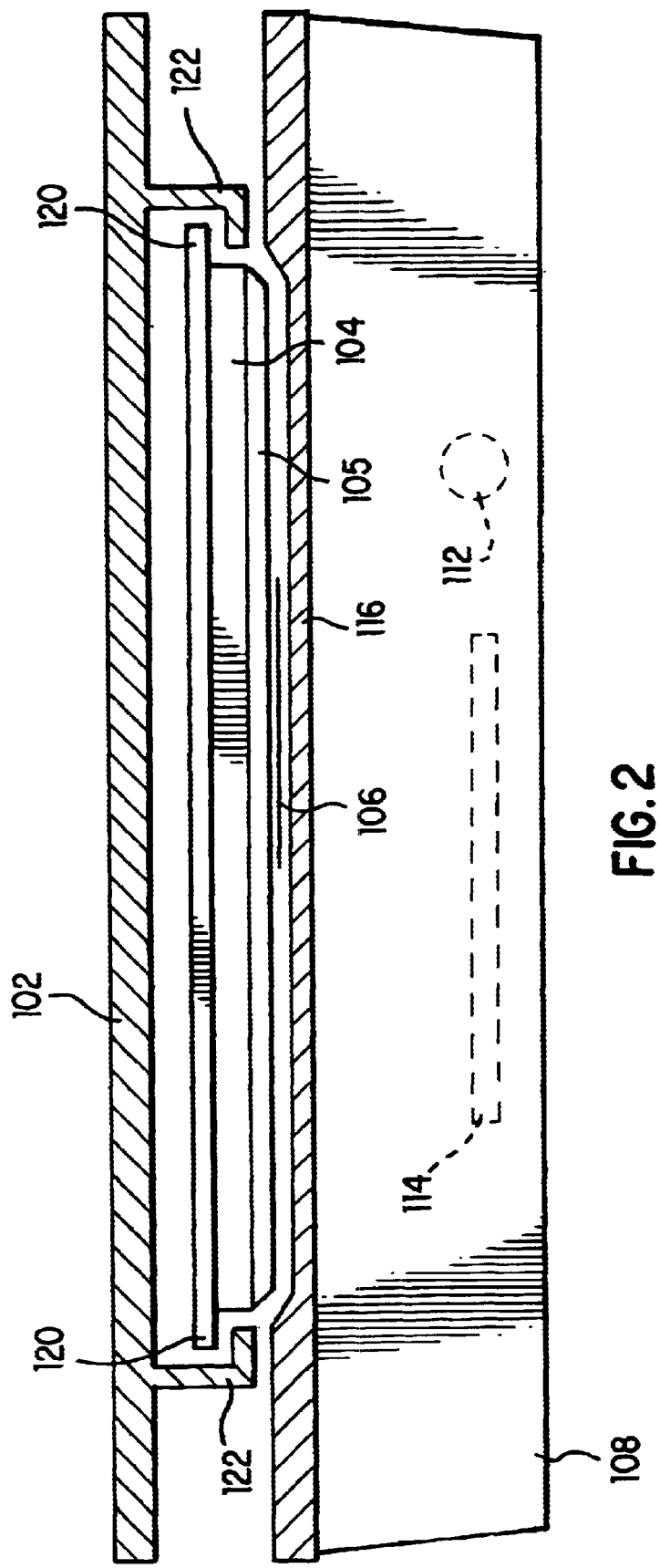
FIG. 2 illustrates a side view of a scanner with a removable flat panel illuminator adapter in the scanner lid according to a second embodiment of the present invention.

FIG. 2 illustrates a second embodiment of the present invention in which the flat panel illuminator 104 has ledges 120 which enable it to be slid into brackets 122 of the scanner lid 102 when a transparency 106 is to be scanned. Preferably, when the flat panel illuminator 104 is slid or snapped into the scanner lid brackets 122, a switch or button will be activated, which turns off the scanner light source 112 and switches power to the flat panel illuminator 104 during the scan. Another embodiment might have the end user pressing a button on the scanner 108 or indicating through host computer software that a transparent document is to be scanned, so that the flat panel illuminator 104 will be powered and lit and the scanner light source 112 will not be powered and lit during the scan of the transparent document 106. Such a removable flat panel illuminator 104 would be compatible with other removable and replaceable secondary reflective surfaces, as taught in U.S. patent application Ser. No. 09/016,562, entitled Reflector for Document Scanner or Copier by Patrick Batten et al, filed Jan. 30, 1998, which is incorporated herein for all that it teaches and describes.

Figure 3:
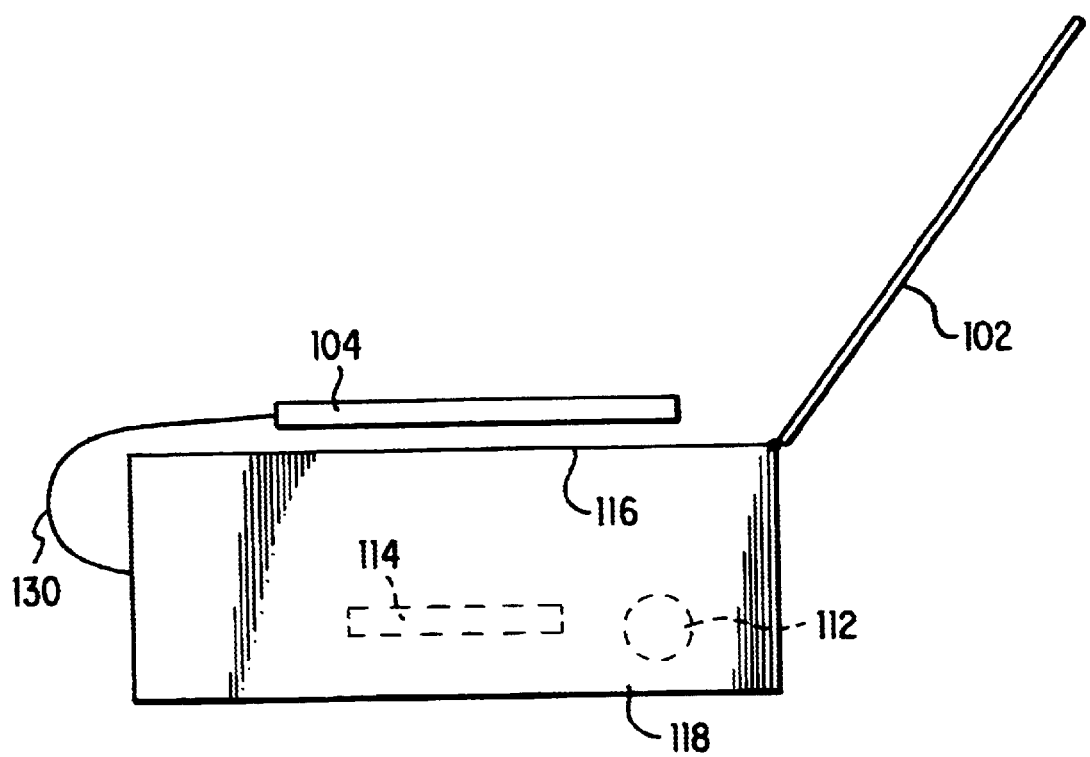
FIG. 3 illustrates a side view of a scanner with a plug-in flat panel illuminator adapter according to a third embodiment of the present invention.

FIG. 3 illustrates a third embodiment of the present invention in which the flat panel illuminator transparency adapter 104 is a separate attachment to the scanner 108. The adapter 104 may be plugged into the scanner 108 with a cable 130 when a transparent document is to be scanned. When the adapter 104 is plugged into the scanner 108, the scanner may provide power to the adapter 104 and the light source 112 within the scanner 108 may be turned off. Alternatively, the end user may push a button (not shown) on the scanner 108 or use a computer interface to turn on the adapter 104 and turn off the light source 112 in the scanner 108.

Figure 4:
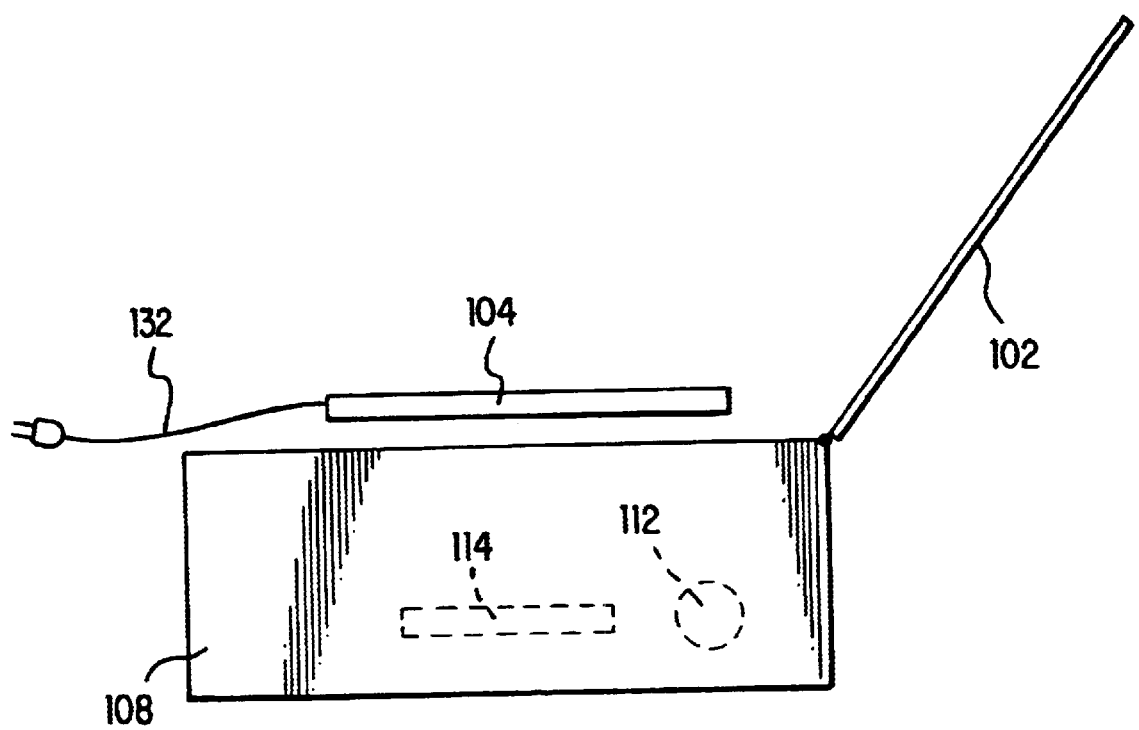
FIG. 4 illustrates a side view of a scanner with a separate flat panel illuminator adapter according to a fourth embodiment of the present invention.

FIG. 4 illustrates a fourth embodiment of the present invention in which the flat panel illuminator transparency adapter 104 is completely separate from the scanner 108. The adapter 104 may have it's own on board power source or alternatively be plugged into a power source, such as a typical electric wall outlet via a cable 132. In this embodiment, the end user may push a button (not shown) on the scanner 108 or use a computer interface to turn on the adapter 104 and turn off the light source 112 in the scanner 108. This embodiment would allow the transparency adapter 104 to be used with any flat bed scanner. Also, the light source 112 of the flat bed scanner 108 may be left on during the scan of a transparent document 106, however, leaving the scanner light source 112 on may decrease the quality of the scan.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A document scanner comprising:
   a scanner base;
   a light source within said scanner base;
   a scanner lid attached to the scanner base;
   an image area disposed between the scanner base and the scanner lid; and
   a flat panel illuminator light source within the scanner lid, wherein said flat panel illuminator light source directs light through the image area and into the scanner base for processing, the flat panel illuminator light source further comprising a reflective surface adapted to reflect light received from the light source within the scanner base.

2. The document scanner according to claim 1, wherein only one of said light source within said scanner base or said flat panel illuminator light source within said scanner lid may be lit during a scan.

3. The document scanner of claim 1, wherein said flat panel illuminator is removably attached to said scanner lid.

4. A document scanner comprising:
   a scanner base;
   a light source within said scanner base;
   a scanner lid attached to the scanner base;
   an image area disposed between the scanner base and the scanner lid; and a flat panel illuminator light source within the scanner lid, wherein said flat panel illuminator light source directs light through the image area and into the scanner base for processing, wherein said flat panel illuminator is removably attached to said scanner lid.

5. The document scanner according to claim 4, wherein said flat panel illuminator is slidingly attached to said scanner lid.

6. The document scanner according to claim 4, wherein said flat panel illuminator may be snapped into and snapped out of said scanner lid.

7. The document scanner according to claim 4, wherein when said flat panel illuminator is attached to said scanner lid, power is supplied to said flat panel illuminator and power is not supplied to said light source within said scanner base.

8. An adapter for scanning a transparent image using a reflective scanner, the reflective scanner having a platen for receiving a reflective document, the reflective scanner having a light source within the reflective scanner, the adapter comprising:

a scanner lid; and a flat panel illuminator attached to said scanner lid, wherein light from said flat panel illuminator passes through said transparent image, through said platen and into said reflective scanner for processing during a scan of a transparent image, the flat panel illuminator further comprising a reflective surface adapted to reflect light received from the light source within the reflective scanner.

9. The adapter for scanning a transparent image using a reflective scanner according to claim 8, wherein when power is supplied to said flat panel illuminator, power is not supplied to said light source within said reflective scanner.

10. A method for manufacturing a scanner comprising the following steps:

(a) providing a scanner base having a light source disposed therein;

(b) attaching a scanner lid to said scanner base; and (c) attaching a flat panel illuminator to said scanner lid, the flat panel illuminator comprising a reflective surface adapted to reflect light received from the light source in the scanner base.

11. The method of claim 10, wherein attaching the flat panel illuminator comprises removably attaching the flat panel illuminator to said scanner lid.

12. The method of claim 10, further comprising configuring only one of said light source within said scanner base or said flat panel illuminator light source to be lit during a scan.

13. A method for scanning a transparent document with a reflective scanner, said reflective scanner having a main body with an internal scanner light source, a photosensitive device, a scanner lid and a platen, said method for scanning a transparent document comprising the following steps:

(a) putting said transparent document on said platen;

(b) removably securing a flat panel illuminator light source to the scanner lid over said transparent document;

(c) turning said flat panel illuminator light source on; and (d) scanning said transparent document.

14. The method for scanning a transparent document according to claim 13, wherein said internal scanner light source is off during the scanning of said transparent document.

15. The method for scanning a transparent document according the claim 13, wherein said flat panel illuminator light source is integral with said scanner lid.

16. The method for scanning a transparent document according to claim 13, wherein said flat panel illuminator light source is plugged into said scanner during the scanning of a transparent document.

17. The method for scanning a transparent document according to claim 13, wherein said flat panel illuminator light source is separate from said scanner and has a separate power supply during the scanning of a transparent document.

* * * * *